United States Patent [19]

Aly et al.

[11] Patent Number: 4,964,118
[45] Date of Patent: Oct. 16, 1990

[54] APPARATUS AND METHOD FOR ECHO CANCELLATION

[75] Inventors: Sami A. H. Aly, Kanata; Andrew G. Deczky, Nepean, both of Canada

[73] Assignee: Northern Telecom Limited, Montreal, Canada

[21] Appl. No.: 261,133

[22] Filed: Oct. 24, 1988

[51] Int. Cl.$^5$ ............................................... H04B 3/23
[52] U.S. Cl. .................................... 370/32.1; 379/411
[58] Field of Search ................. 370/32.1, 32; 379/410, 379/411

[56] References Cited

U.S. PATENT DOCUMENTS

| 3,922,505 | 11/1975 | Höge | 379/410 |
| 4,347,615 | 8/1982 | Ash | 333/18 |
| 4,769,808 | 9/1988 | Kanemasa et al. | 379/410 |
| 4,789,996 | 12/1988 | Butcher | 375/120 |

FOREIGN PATENT DOCUMENTS 0245734 10/1987 Japan ................................ 370/32.1

OTHER PUBLICATIONS

"Digital Echo Cancellation for Baseband Data Transmission", by Niek A. M. Verhoeckx, et al., IEEE Transactions of Acoustics, Speech and Signal Processing, vol ASSP-27, No. 6, Dec. 1979.

"Mixed Recursive Echo Canceller (MREC)", by C. Mogavero, et al., CSELT Technical Reports, vol. NX, No. 2, Mar. 1987.

"Architecture for Fully Integrated Echo Canceller LSI Based on Digital Signal Processing", by Hiroshi Takatori, et al., Central Research Laboratory, Hitachi Ltd., Kokubunji, Tokyo, Japan, ©1987 IEEE.

"Timing Recovery in Digital Subscriber Loops Using Baud-Rate Sampling", by C. P. Jeremy Tzeng, et al., IEEE Journal on Selected Areas in Communications, vol. SAC-4, No. 8, Nov. 1986, pp. 1302-1311.

"Timing Recovery in Digital Synchronous Data Receivers", by Kurt H. Mueller et al., IEEE Transactions on Communications, vol. COM-24, No. 5, May 1976.

Primary Examiner—Jin F. Ng
Assistant Examiner—Randall S. Vaas
Attorney, Agent, or Firm—Foley & Lardner, Schwartz, Jeffery, Schwaab, Mack, Blumenthal & Evans

[57] ABSTRACT

In order to deal with echoes having exceptionally long tails, such as are generated by 2B1Q signals in ISDN systems, an echo canceller comprises a first echo cancelling means, conveniently a transversal filter, operative over a first number of baud periods, and filter means, conveniently an infinite impulse response filter, operative over a later number of baud periods. The filter means responds to each symbol of the transmitted signal to generate a pulse response which decays exponentially according to a predetermined function. The echo canceller further comprises means for subtracting the outputs of the first echo cancelling means and the filter means, respectively, from the received signal. The filter means may have more than one tap, enabling the exponential decay function to be adjusted to give a closer approximation to the shape of the echo tail.

32 Claims, 7 Drawing Sheets

APPARATUS AND METHOD FOR ECHO CANCELLATION

FIELD OF THE INVENTION

This invention relates to digital data transmission systems and is applicable especially to an apparatus and method for echo cancellation in digital subscriber loop interface circuits.

BACKGROUND TO THE INVENTION

The digital subscriber loop interface circuit usually will comprise two parts; a transmitter and a receiver. The function of the transmitter is to put a series of pulses, usually shaped by some form of filter, on the loop. In the U-interface of an ISDN (Integrated Services Digital Network) system, these pulses are likely to be 4-level pulses, particularly encoded as the so-called 2B1Q code (two binary, one quaternary) recommended by the American National Standards Institute T1 Working Group.

The function of the receiver is to detect pulses being sent from the far end of the loop, which is difficult because these pulses are distorted. One source of distortion is coupling of the transmit pulses, being put onto the loop, directly across the hybrid circuit and into the receiver input as "echoes", which is a common problem when operating on a two-wire system.

Such transmit pulse echoes are removed by echo-cancellation, typically using a transversal filter to derive a function of the transmit signal for subtraction from the received signal.

Basically a code such as Alternate Mark Inversion (AMI), which guarantees that alternate pulses will be inverted, does not generate long tails. The echo tail is generated by a pulse of a certain amplitude and proceeds to decay through the succeeding bit periods or time slots. Since the next pulse will be of the opposite polarity it will cancel out most of the tail of the preceding pulse. For a non-redundant code like 2B1Q, however, the succeeding pulses might be the same amplitude and the same polarity so rather than a succeeding pulse cancelling out the tail, it can in fact help to maintain the tail. As a result, the long tail presents a considerable problem for the echo canceller.

Several ways of approaching the problem are possible. One, for example, takes account of the fact that the hybrid tends to reduce the low frequency component and hence introduces the tail. To overcome this effect, however, would require that the inductance of the hybrid transformer, and hence its size, be increased. Because this is an analogue part of the circuit, the increase could not be achieved without incurring a significant cost increase at the front end.

A second way is to increase the high pass filtering at the receiver input which would have the effect of reducing the length of the tail. This is not preferred, however, because it would increase noise, particularly since such a filter is located early in the circuit where the signal is still very noisy.

A third possibility is to use more taps in the transversal echo canceller. For a 2B1Q signal or the like, this would require a very large number of taps because of the length of the tail involved. Unfortunately increasing the number of taps results in an increase in complexity, convergence time, and noise generated by the echo canceller.

An object of the present invention is to provide an echo canceller and echo cancellation method for echoes having relatively long tails but without involving the drawbacks mentioned hereinbefore.

BRIEF SUMMARY OF THE INVENTION

According to one aspect of the present invention an echo canceller for a transceiver in a digital transmission system comprises a first cancelling means operative over a first number of baud periods and filter means operative over a later number of baud periods, said filter means being responsive to a symbol of a transmitted signal for generating a pulse response decaying exponentially according to a predetermined function, said echo canceller further comprising means for subtracting such pulse response from a received input signal.

Pulse responses for successive symbols may be weighted according to the magnitude of the generating symbol and summed over time. Thus, in any baud period, the value of the echo canceller function will be the sum of the instant values of the pulse responses of a series of preceding symbols, scaled to take account of the amplitude of the particular symbol concerned. Preferably the transmitted signal is a two-binary one quaternary (2B1Q) signal.

Whereas a typical transversal filter echo canceller works baud by baud to derive samples and estimate the echo, the pulse response approach proposed in accordance with this invention generates an exponentially decaying function, i.e. a tail, using a single symbol and aims to match the decay of the pulse tail with that of the echo tail of the corresponding symbol. A preferred way of generating such a tail function employs an infinite pulse response (IIR) filter.

Thus $F_i$, which is the exponential function generated by the symbol will be made up of a series of values in a geometrical series expressed as:

$$F(n) = a(n-M) + pF(n-1).$$

where $a(n-M)$ is the single pulse generating the function, for $n=M$; $=0$ else, and $n$ is the baud index.

The term $a(n-M)$ generates the first value in the series, and is necessary because the progression given in the second half of the equation is referred back to the preceding value; $p$ is a constant which determines the rate of decay of the function $F(n)$.

It has been found that a value of $p$ between 0 and 1 gives performance superior to that of either a transversal filter, which corresponds to the $p=0$ case, since it sums only one sample at a time baud by baud, or a running digital sum (RDS) echo canceller which continually aggregates the transmitted symbols and corresponds to the value $p=1$. Preferably $p$ is in the range 0.9 to 0.98, the actual value being determined by the inductance of the hybrid transformer and the line/loop termination impedance.

The pulse response will settle to its exponential decay within a predetermined time (M bauds) after the occurrence of the originating symbol. Conveniently, the worst case value will be assured, since the time will vary according to, for example, loop characteristics, and typically will be in the range 15 to 30 bauds.

In a practical circuit different loops will have different characteristics so a single exponential pulse response generated by the echo canceller will not match all of them. Also, during manufacture the hybrid parameters can vary which may also lead to variations in the shape of the echo tail. This also must be compensated for. It would be possible to adapt the value of p i.e. the rate of decay component, but this would lead to increased echo canceller complexity.

Preferably said filter means has at least two taps with different rates of decay. The pulse response of the filter is then obtained by summing the pulse responses of the two taps. This enables minor adjustment to be made to make the pulse response a closer approximation to the actual echo wave shape.

An equation for an echo canceller response y(n) is:

$$y(n) = \Sigma^N_{i=1} h_i(n)$$

where N is the number of taps, $h_i(n)$ is the tap weight, and $F_i$ is the echo function for the $i^{th}$ tap that will be summated in making up the tail.

The value $h_i(n)$ may be updated for each baud, preferably according to the equation:

$$h_i(n+1) = h_i(n) + ge(n).F_i(n)$$

The value e(n) is the residual error at the $n^{th}$ baud; and g is a constant, typically in the range $2^{-10}$ to $2^{-12}$.

Said filter means may be in parallel with a conventional transversal filter and/or memory echo canceller operating on the earlier part of the echo, i.e. prior to about 15 to 30 bauds after the originating symbol.

According to a second aspect of the invention an echo cancellation method for a digital transmission system comprises the steps of cancelling echo in a digital signal over a first number of baud periods using first canceling means and over a later number of baud periods using filter means. For each baud of a transmitted signal, the filter means generates a pulse response which decays exponentially according to a predetermined function. Such pulse response is subtracted from the received signal.

BRIEF DESCRIPTION OF THE DRAWINGS

An embodiment of the invention will now be described, by way of example only, with reference to the accompanying drawings, in which.

DETAILED DESCRIPTION OF A PREFERRED EMBODIMENT

Figure 1:
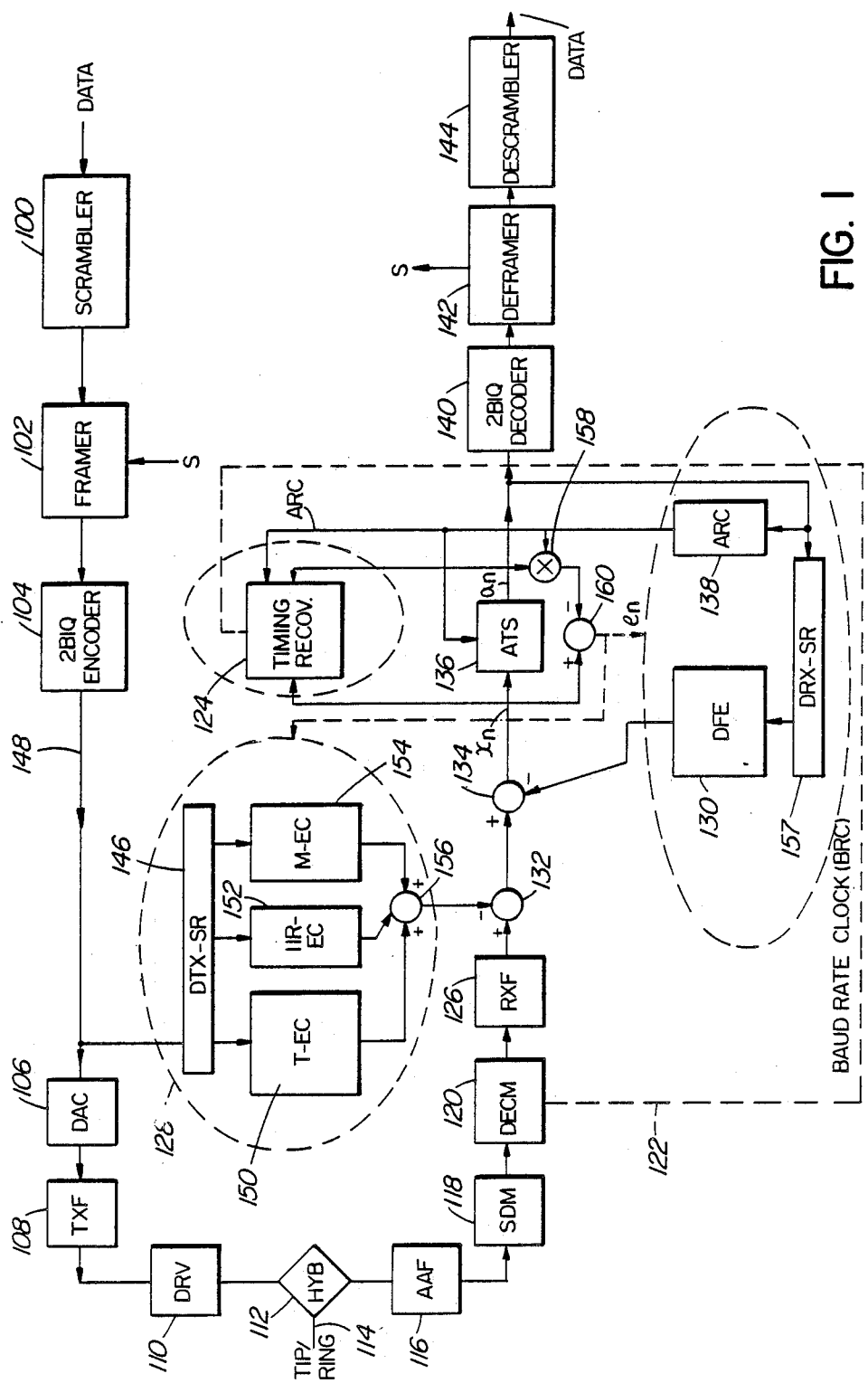
FIG. 1 is a block schematic diagram of a U-interface for transmitting and receiving 2B1Q signals in an ISDN digital transmission system.

Referring to FIG. 1, which illustrates a U-interface transceiver comprising a transmitter and a receiver, the components encircled by broken lines, namely the echo canceller, decision feedback equalizer, adaptive reference circuit (ARC), and timing recovery circuit are embodied in a digital signal processor.

Digital data for transmission at 160 kb/s is applied to a scrambler 100 which encodes the data into a pseudo-random bit stream which is formatted by framer 102 into frames of 240 bits or 120 bauds, in accordance with specification T1D1. The framer 102 also includes a 9-baud signalling word(s) in each frame of data.

The framed and scrambled signal is applied to 2B1Q encoder 104 where it is converted to a parallel format by a serial-to-parallel converter, which produces dibits in the combinations 00, 01, 10, 11. Dibit-to-symbol mapping produces the four corresponding levels −3, −1, +3 and +1. Digital-to-analogue converter 106 converts the levels −1, −3, +1, +3 to corresponding voltage levels for application to transmit filter 108. The digital-to-analogue converter 106 needs to be at least 3 bits capacity. Digital-to-analogue converter 106 converts the binary two's complement representation of the signal on line 148 into a voltage level for application to driver 110 for transmission via the hybrid 112 onto the tip and ring of the subscriber loop 114. The driver 110 comprises a power driver to drive the transmit port of the hybrid 112. The transmit filter 108 takes the high frequencies out of the pulses to avoid crosstalk and EMI (electromagnetic interference) effects during transmission.

The incoming signals from the subscriber loop 114 leave the receive port of the hybrid 112 and are processed by a corresponding 2B1Q receiver employing baud rate sampling and timing recovery. The receiver comprises a channel interface 116 which includes an anti-aliasing filter to remove high frequencies. The filtered signal from the channel interface 116 is applied to a sigma-delta modulator 118 which oversamples the received signal, effectively performing analogue-to-digital conversion of the signal. The output of the sigma-delta modulator 118 is supplied to a decimator 120. The decimator 120 and the anti-aliasing filter 116 perform the same functions generally as a low pass filter, sampler and analogue-to-digital converter.

The sigma-delta modulator 118 employs an oversampled converter which runs at about 10 Mhz and hence oversamples the signal by a very large ratio. The sampling phase of decimator 120 is adjustable by means of the Baud Rate Clock (BRC) applied to it on (broken) line 122 from a timing recovery circuit 124. This decimator 120 runs at 10.24 MHz, so the sampling instant can be moved in 1/10.24 MHz steps in response to the recovered Baud Rate Clock, by simply taking a different sample out i.e. by just stepping the clock signal backwards or forwards by one unit of the period of the 10.24 MHz clock as in a digital phase-locked loop.

Figure 2A:
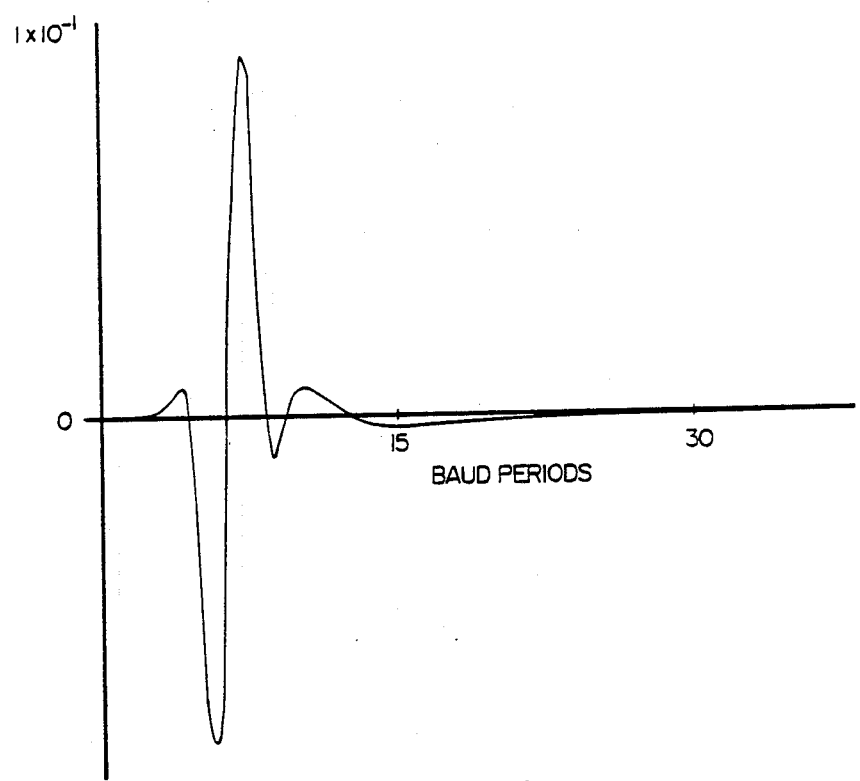
FIGS. 2A and 2B illustrate the echo path response at a point within the interface.
Figure 2B:
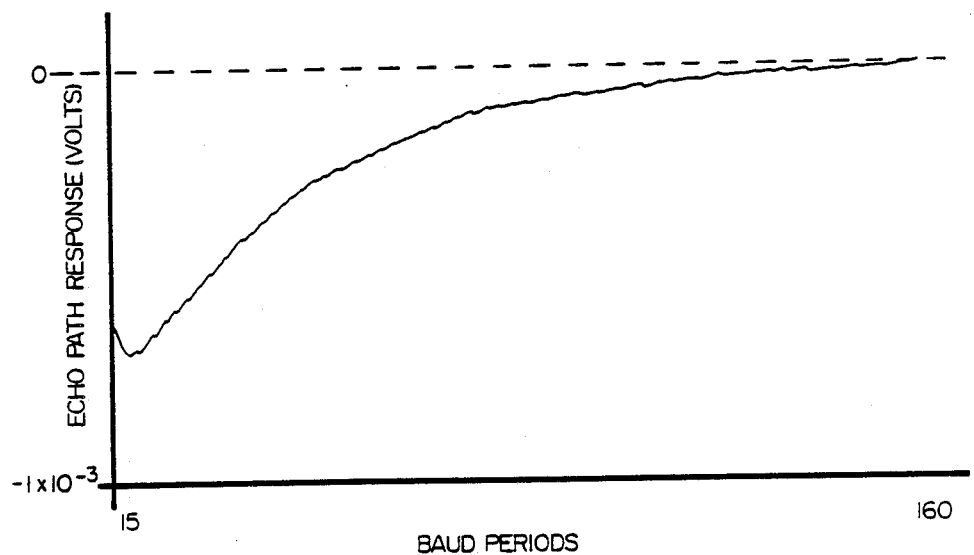

The digitized samples of the received analogue signal, from the output of decimator 120, are filtered by high pass receiver filter 126, which serves as a feed-forward equalizer and enhances high frequencies. A typical echo path response measured at the output of receiver filter 126 is shown in FIG. 2, the main pulse being shown in FIG. 2A and the echo tail being shown, to a larger scale, in FIG. 2B.

Referring again to FIG. 1, correction signals from an echo canceller 128 and a decision feedback equalizer 130, respectively, are subtracted from the filtered sample by subtractors 132 and 134, respectively, resulting in an equalized version $x_n$ of the far-end signal at the input of adaptive threshold slicer 136. The adaptive threshold slicer 136 allocates the individual symbols of the received signal to one of the four levels specified for the 2B1Q signal to constitute the recovered far-end signal $a_n$. The thresholds are adapted in response to an adaptive reference signal ARC provided by an adaptive reference control circuit 138. A multiplier 158 multiplies the recovered far-end signal $a_n$ by the adaptive reference signal ARC. The result is subtracted, by means of subtractor 160, from the equalized far-end signal $x_n$ to give an adaptation error signal $e_n$ which is applied not only to the adaptive reference circuit 138, but also to the echo canceller 128 and the decision feedback equalizer 130.

The recovered far-end signal $a_n$ from the output of adaptive threshold slicer 136 is applied to a 2B1Q decoder 140 which operates in the inverse way to the 2B1Q encoder 104. The decoded signal is segregated into its components by a deframer 142 which breaks down the framing and extracts the 9-bit signalling word(s). Finally the data is descrambled by descrambler 144.

As mentioned earlier, problems arise because the pulses being transmitted onto the loop 114 result in echo on the receiver side of the hybrid due to transhybrid coupling and it is difficult to segregate the echoes of these transmitted pulses from the pulses being received from the loop 114.

Echo canceller 128 generates a replica of the transmitted pulse wave form and subtracts it from the received pulses. This echo canceller 128 comprises a shift register 146 which has its input connected to line 148 (the output of encoder 104) and has three outputs, one connected to transversal echo canceller 150, a second connected to an infinite pulse response filter echo canceller (IIR-EC) 152, and the third connected to a memory echo canceller 154. The outputs of the three echo cancellers 150, 152 and 154, respectively, are summed by summing means 156 and subtracted from the filtered sample by subtractor 132.

Intersymbol interference is corrected by means of the decision feedback equalizer 130 which is supplied by a shift register 157 having an input connected to the output of adaptive threshold slicer 136. The output of transversal filter digital feedback equalizer 130 is applied to the negative input of subtractor means 134 for subtraction from the recovered signal.

When the various corrections have been made to the signal, the timing instant is determined by timing recovery means 124 which has one input connected to the input of adaptive threshold slicer 136 to receive the equalized far-end signal $x_n$, and a second input connected to the output of adaptive threshold slicer 136 to receive the recovered far-end signal $a_n$. The timing recovery means 124 also receives the adaptation reference signal ARC from the adaptive reference circuit 138 and produces the Baud Rate Clock which, as previously mentioned, is applied to decimator/interpolator 120 (via the broken line) and controls the sampling instant at which decimator 120 samples the received signal.

Figure 3:
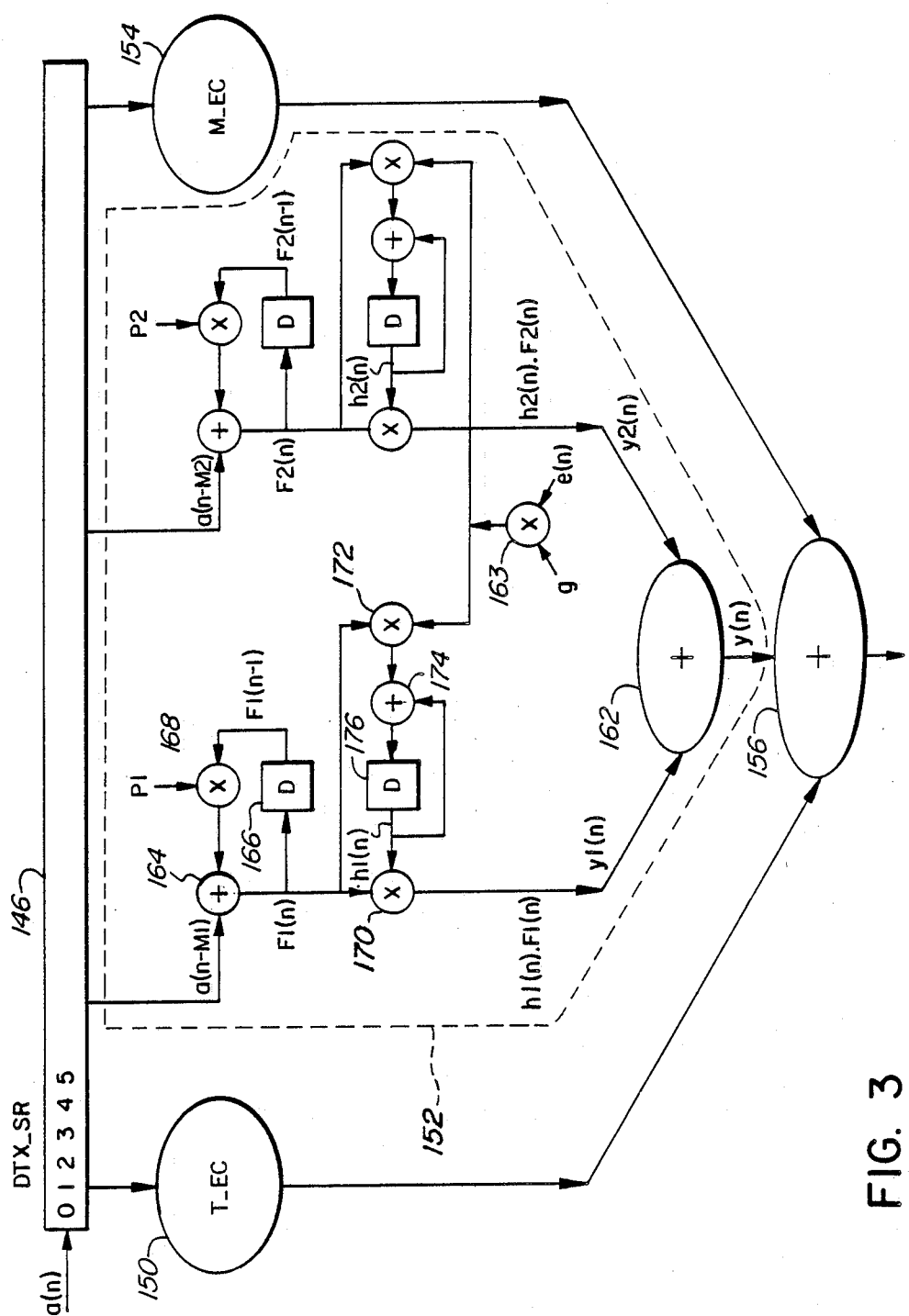
FIG. 3 is a block schematic diagram illustrating the pulse response echo canceller part of the interface of FIG. 1.
Figure 4A:
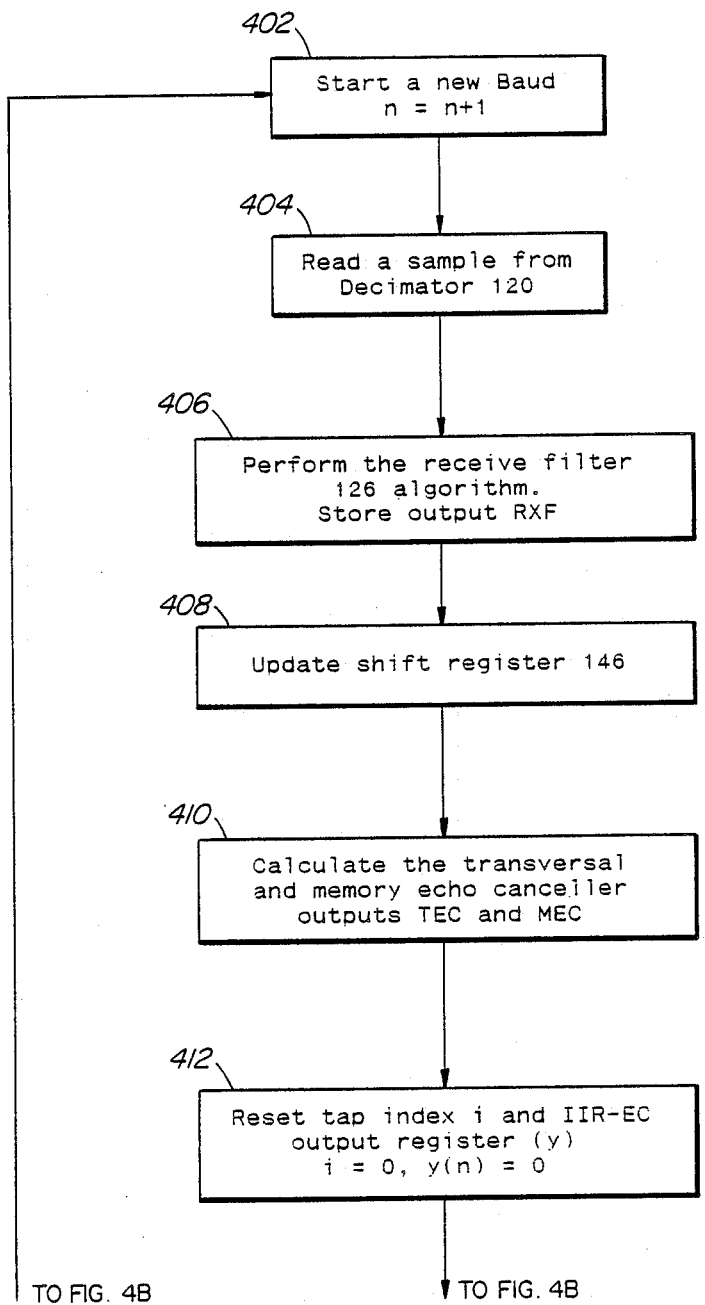
FIGS. 4A, 4B, 4C, and 4D are a flowchart representing the operation of a digital signal processor implementation of the invention.
Figure 4B:
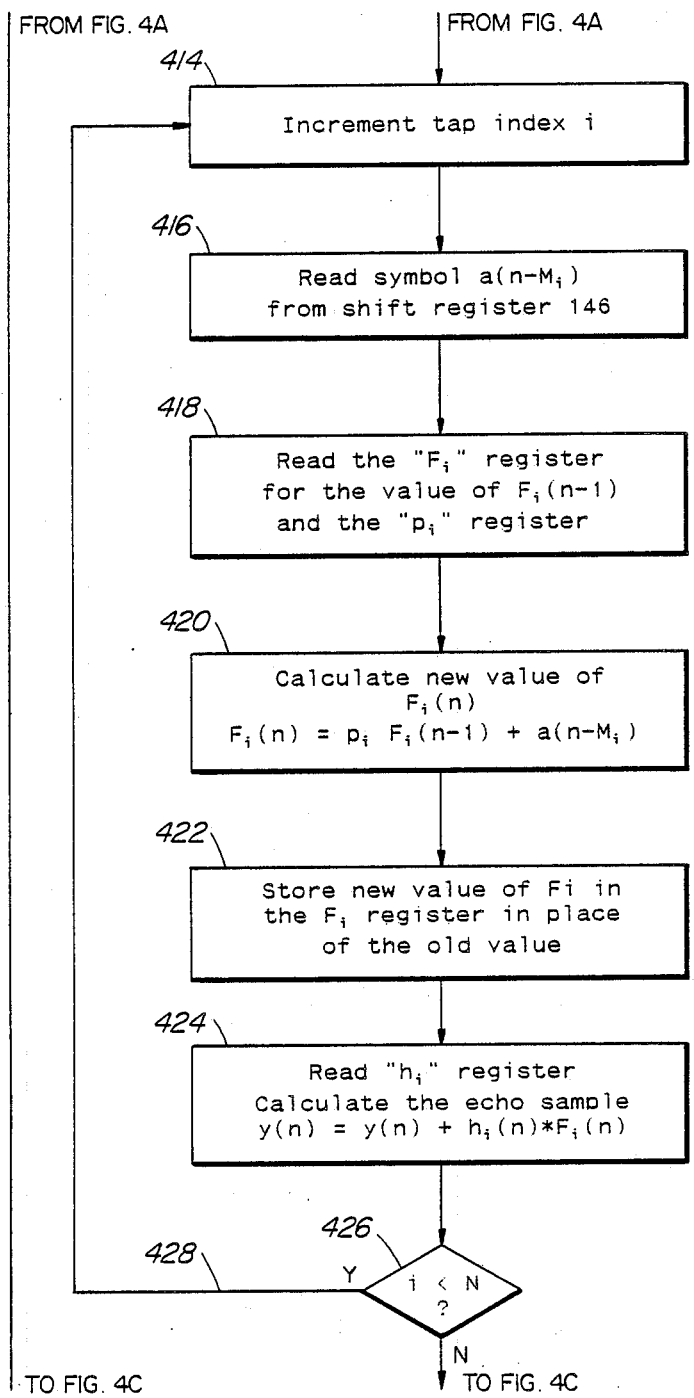
Figure 4C:
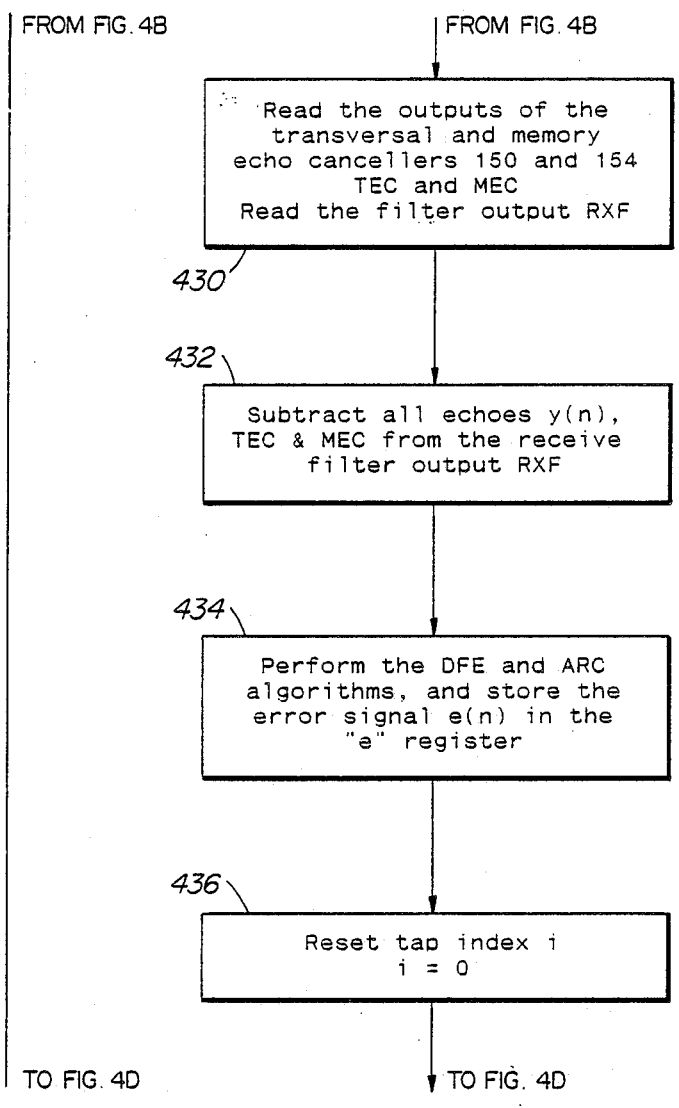
Figure 4D:
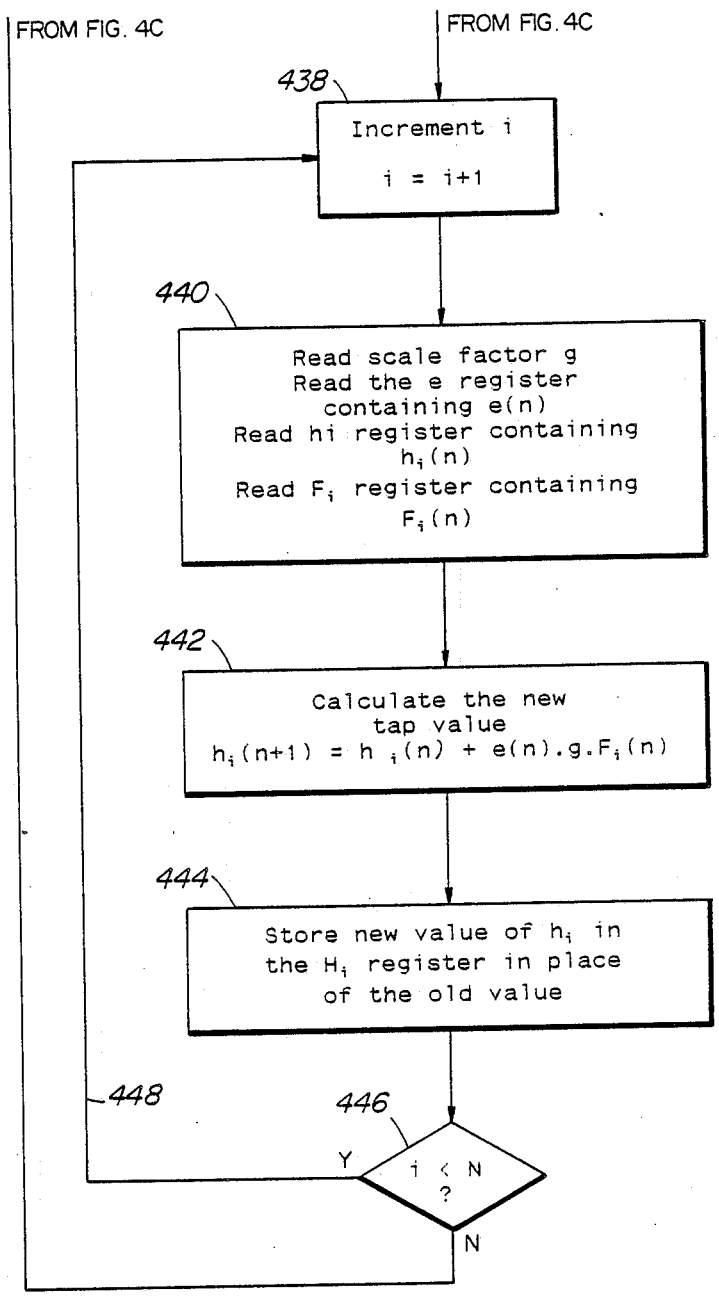

The infinite pulse response echo canceller is shown in more detail in FIG. 3 and a flowchart of its operation is shown in FIG. 4.

The echo canceller 128 is fabricated using a digital signal processor. It is represented schematically, however, in FIG. 3, which also shows the transversal filter echo canceller 150 and memory echo canceller 154, though not in detail since they may be of known construction. The infinite pulse response echo canceller 152 is shown as having two taps, for the signals $a(n-M_1)$ and $a(n-M_2)$, respectively, from the shift register 146. The outputs of the two taps, designated ECI1 and ECI2, respectively, are summed by summing means 164, the output of which is summed with the outputs of the transversal filter echo canceller 150 and memory echo canceller 154 by summing means 156, as previously mentioned.

Since both taps are similar in construction, only one will be described—that for the signal $a(n-M_1)$. The baud sample $a(n-M_1)$ from the shift register 146 is applied to a summing means 164. The output of summing means 164 is connected to a one baud delay 166 the output of which is connected to one input of a multiplier 168 which has a second input set to a reference level $P_1$. The output of the multiplier 168 is connected to a second input of the summing means 164. Thus, the loop formed by summing means 164, delay 166 and multiplier 168 sums the weighted values of successive samples of $a(n-M_1)$ to give the value $F_1$, at any instant, at the output of summing means 164.

The output of summing means 164 is applied to multipliers 170 and 172, respectively. Multiplier 172 multiplies the signal $F_1(n)$ by the product of the adaptation error signal $e(n)$, from the output of summing means 160 (FIG. 1), and the scale factor $g$, such product being derived by a multiplier 163. The product is supplied to one input of a summing means 174, the output of which is supplied to a one baud delay 176. The output of delay 176 is supplied to a second input of multiplier 170 and a second input of summing means 174.

The multiplier 172, summing means 174 and delay 176 produce the value of function $h_1(n)$ which, multiplied by function $F_1(n)$ by means of multiplier 170 gives $h_1(n).F_1(n)$ as the output of the tap, which is supplied to summing means 162.

As mentioned previously, the second tap is similarly constructed and operates in a similar way upon the sample $a(n-M_2)$ to give the value $h_2(n).F_2(n)$. Summing $h_1(n).F_1(n)$ and $h_2(n).F_2(n)$ gives $y(n)$ at the output of the multiplier 162.

Operation of the echo canceller is depicted by the flowchart in FIG. 4.

In the digital signal processor implementation, permanent registers are assigned to $g$, $p_i$, $F_i$, $h_i$, $i=1$, N and $a(n-M_i)$; $=1..Max$ ($M_i$) Temporary registers are provided for i, $y(n)$ and e.

Referring to FIG. 4, the cycle begins with the selection of a new baud, step 402, and a new sample is read from the decimator 120, step 404. The algorithm for the receive filter 126 is performed, step 406, and the output (RXF) of receive filter 126 is stored. Step 408 updates the shift register 146, i.e. shifts the new input symbol into the shift register 146, at the same time shifting the contents one position. Step 410 calculates the outputs TEC and MEC of the transversal echo canceller 150 and memory echo canceller 154, respectively. Step 412 resets the tap index i and output (y) of the IIR echo canceller 152 so that $i=0$, $y(n)=0$.

The tap index i is then incremented, step 414, following which the symbol $a(n-M_i)$ is read from the shift register 146, step 416. The $F_i$ register is then read, together with the $p_i$ register for the values $F_i(n-1)$ and $p_i$, respectively (Step 418).

The new value of $F_i(n)$ is then calculated, step 420, according to the expression:

$$F_i(n)=a(n-M_i)+p_iF_i(n-1)$$

The new value of $F_i$ is stored in the $F_i$ register, replacing the old value, (step 422). In step 424, the $h_i$ register is read and the echo sample $y(n)$ calculated according to the expression:

$$y(n)=y(n)+h_i(n)*F_i(n)$$

If all the taps have not been computed, decision step 426, the loop 428 causes the process steps 414 to 424 to be repeated. When all taps have been done, the outputs of the transversal echo canceller 150, memory echo canceller 154, and receiver filter 126, TEC, MEC and RXF, respectively, are read, (step 430). The resulting echo values y(n), TEC and MEC are subtracted from the output RXF of the receive filter 126, step 432. The algorithms for the decision feedback equalizer 130 and adaptive reference control circuit 138 are then performed, step 434, and the error signal e(n) stored in the appropriate register. As mentioned previously, the error signal e(n) is used by the echo canceller 128 as well as the decision feedback equalizer 130 and adaptive reference control 138.

At this point the tap index i is reset to zero, step 436. The final sequence of operations uses the error value e(n) to update all of the taps. Thus, step 438 increments the value of i to i+1. The next step, 440, reads the scale factor g, the value of e(n) from the 'e' register, the value of $h_i(n)$ from their respective registers, and the value of $F_i(n)$ from the $F_i$ register. The new tap value $h_i(n+1)$ is then calculated as $h_i(n+1)=h_i(n)+e(n).g.F_i(n)$, step 442. The $h_i$ register is then updated, step 444, by storing the new value of $h_i$ in the $h_i$ register in place of the old value. If this is not the last tap, N, as determined by decision step 446, the loop 448 causes the steps 438 to 444 to be repeated. When all taps have been completed, decision step 446 returns the program to the beginning, step 402, and the next baud is processed.

We claim:

1. An echo canceller for a transceiver in a digital transmission system comprising a first cancelling means operative over a first number of baud periods of a digital signal and recursive filter means operative over a second number of baud periods of said signal, said first number of baud periods occuring later in time than said second number of baud periods, said recursive filter means comprising a plurality of taps and means for summing, in each baud period, the respective outputs $F_i(n)$ from said plurality of taps according to the expression:

$$y(n) = \sum_{i=1}^{N} F_i(n)$$

where i is the number of the tap, $F_i(n)$ is the function F(n) for the $i^{th}$ tap, and N is the number of taps, each tap of said recursive filter means being responsive to said digital signal in each of said second number of baud periods for generating an output F(n) comprising the cumulative sum of pulse responses for the signal in preceding baud periods, each of said pulse responses decaying exponentially according to a predetermined function, said echo canceller further comprising means for subtracting in each baud period the instant output of said recursive filter means from a received signal.

2. An echo canceller as defined in claim 1, wherein said filter output F(n) is derived according to the expression:

$$F(n)=a(n-M)+pF(n-1)$$

where a(n−M) is the signal in baud period (n−M), p is a constant determining the rate of decay, n is the current baud index, and M is the number of bauds, after occurrence of the symbol, before the function F(n) commences cancellation.

3. An echo canceller as defined in claim 2, wherein M is in the range 15 to 30 bauds.

4. An echo canceller as defined in claim 2 or 3, wherein p is in the range 0.90 to 0.98.

5. An echo canceller as defined in claim 1, further comprising weighting means for weighting said outputs from said plurality of taps before summation according to the expression:

$$y(n) = \sum_{i=1}^{N} h_i(n) F_i(n)$$

where $h_i(n)$ is the weight of the $i^{th}$ tap.

6. An echo canceller as defined in claim 5, wherein $h_i(n)$ is fixed.

7. An echo canceller as defined in claim 5, wherein $h_i(n)$ is adaptive.

8. An echo canceller as defined in claim 7, wherein $h_i(n)$ is adaptive in accordance with the expression:

$$h_i(n+1)=h_i(n)+g.e(n).F_i(n)$$

where g is a constant in the range $2^{-10}$ to $2^{-12}$ and e(n) is the residual error in the received signal after cancellation.

9. An echo canceller as defined in claim 8, wherein the signal e(n) is derived after equalization.

10. An echo canceller as defined in claim 8 or 9, wherein e(n) is an adaptive reference signal derived as a function of pulse amplitude.

11. An echo canceller as defined in claim 1, wherein said transmitted signal is encoded as a 2B1Q (two binary, one quaternary) signal.

12. An echo canceller as defined in claim 1, wherein said first cancelling means comprises a transversal filter.

13. An echo canceller as defined in claim 1, wherein said first cancelling means comprises a memory echo canceller.

14. An echo canceller as defined in claim 5, wherein $h_i(n)$ is adaptive in accordance with the expression:

$$h_i(n+1)=h_i(n)+g.sgn[e(n).F_i(n)].$$

15. An echo canceller as defined in claim 1, further comprising weighting means for weighting said output from said recursive filter means according to the expression:

$$y(n)=h(n)F(n)$$

wherein h(n) is the weighting coefficient and is adaptive.

16. An echo canceller as defined in claim 15, wherein h(n) is adaptive in accordance with the expression:

$$h(n+1)=h(n)+g.e(n).F(n)$$

where g is a constant in the range $2^{-10}$ to $2^{-12}$ and e(n) is a residual error in the received signal after cancellation.

17. An echo canceller as defined in claim 1, wherein said recursive filter means comprises an infinite impulse response filter.

18. An echo cancellation method for a digital transmission system comprising the steps of cancelling echo in a digital signal over a first number of baud periods of a digital signal using first cancelling means and over a second number of baud periods of said digital signal using recursive filter means comprising a plurality of taps, said first number of baud periods occuring later in time than said second number of baud periods, summing, in each baud period, the respective outputs from said plurality of taps according to the expression:

$$y(n) = \sum_{i=1}^{N} F_i(n)$$

where i is the number of the tap, $F_i(n)$ is the function F(n) for the $i^{th}$ tap, and N is the number of taps, said recursive filter means being responsive to said digital signal in each of said second number of baud periods to generate an output F(n) comprising the cumulative sum of pulse responses for the signal in preceding baud periods, each of said pulse responses decaying exponentially according to a predetermined function, and in each baud period subtracting the instant output of said recursive filter means from a received signal.

19. A method as defined in claim 18, wherein said output F(n) is derived according to the expression:

$$F(n)=a(n-M)+pF(n-1)$$

where $a(n-M)$ is the signal in baud period $(n-M)$, p is the rate of decay, n is the current baud index, and M is the number of bauds, after occurrence of the symbol, before the function F(n) commences cancellation.

20. A method as defined in claim 18, including weighting said pulse responses from said plurality of taps before summation, according to the expression:

$$y(n) = \sum_{i=1}^{N} h_i F_i(n)$$

21. A method as defined in claim 20, wherein $h_i$ is fixed.

22. A method as defined in claim 20, including the step of adapting $h_i$.

23. A method as defined in claim 22, including the step of adapting $h_i$ in accordance with the expression:

$$h_i(n+1)=h_i(n+1)+g.e(n).F_i(n)$$

where g is a constant in the range $2^{-10}$ to $2^{-12}$ and e(n) is the residual error in the received signal after cancellation.

24. A method as defined in claim 18, wherein said transmitted signal is encoded as a 2B1Q (two binary, one quaternary) signal.

25. A method as defined in claim 18, wherein said first cancelling means comprises a transversal filter.

26. A method as defined in claim 18, further including the step of weighting said output from said recursive filter means according to the expression:

$$y(n)=h(n)F(n)$$

and adapting h(n), where h(n) is the weighting function.

27. A method as defined in claim 26, including the step of adapting h(n) in accordance with the expression:

$$h(n)=h(n+1)+g.e(n).F(n)$$

where g is a constant in the range $2^{-8}$ to $2^{-12}$ and e(n) is a residual error in the received signal after cancellation.

28. A method as defined in claim 20, including the step of adapting $h_i$ in accordance with the expression:

$$h_i(n+1)=h_i(n)+g.sgn[e(n).F_i(n)].$$

where $h_i(n)$ is the weight of the $i^{th}$ tap, g is a constant in the range $2^{-8}$ to $2^{-12}$ and e(n) is the residual error in the received signal after cancellation.

29. A method as defined in claim 19, wherein M is in the range 15 to 30 bauds.

30. A method as defined in claim 19, wherein p is in the range 0.90 to 0.98.

31. An echo canceller for a transceiver in a digital transmission system comprising a first cancelling means operative over a first number of baud periods of a digital signal and recursive filter means operative over a second number of baud periods of said signal, said first number of baud periods occurring later in time than said second number of baud periods, said recursive filter means being responsive to said digital signal in each of said second number of baud periods for generating an output F(n) comprising the cumulative sum of pulse responses for the signal in preceding baud periods, each of said pulse responses decaying exponentially according to a predetermined function, said echo canceller further comprising means for subtracting in each baud period the instant output of said recursive filter means from a received signal, wherein said first cancelling means comprises a transversal filter having a plurality of taps and said recursive filter means comprises a single tap having a weight corresponding to that of the last tap of said transversal filter.

32. An echo cancellation method for a digital transmission system comprising the steps of cancelling echo in a digital signal over a first number of baud periods of a digital signal using first cancelling means and over a second number of baud periods of said digital signal, said first number of baud periods occurring later in time than said second number of baud periods, using recursive filter means responsive to said digital signal in each of said second number of baud periods to generate an output F(n) comprising the cumulative sum of pulse responses for the signal in preceding baud periods, each of said pulse responses decaying exponentially according to a predetermined function, and in each baud period subtracting the instant output of said recursive filter means from a received signal, wherein said first cancelling means comprises a transversal filter having a plurality of taps and said recursive filter means comprises a single tap weighted according to the weight of the last tap of said transversal filter.

* * * * *